(12) United States Patent
Miller et al.

(10) Patent No.: US 6,637,555 B2
(45) Date of Patent: Oct. 28, 2003

(54) PNEUMATIC CONNECTIONS FOR VEHICLE SUSPENSIONS

(75) Inventors: Troy A. Miller, Xenia, OH (US); Michael L. Oliver, Xenia, NY (US); William C. Kruckemeyer, Beavercreek, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/798,138

(22) Filed: Mar. 2, 2001

(65) Prior Publication Data

US 2002/0121731 A1 Sep. 5, 2002

(51) Int. Cl.$^7$ .................................................. F16F 9/46
(52) U.S. Cl. ................. 188/266.5; 188/269; 188/319.1; 188/321.11; 188/282.1; 188/266.2; 188/317; 188/322.15; 188/299.1; 267/64.15
(58) Field of Search .......................... 188/266.5, 266.2, 188/269, 319.1, 282.1, 282.8, 283, 289, 317, 322.13, 322.15, 322.21, 321.11, 299.1, 285; 280/6.159, 6.158, 124.159, 5.514, 5.515; 267/218, 64.11–64.28; 16/66, 84; 92/119

(56) References Cited

U.S. PATENT DOCUMENTS

| | | | |
|---|---|---|---|
| 4,022,448 A | * | 5/1977 | Reeder |
| 4,334,600 A | * | 6/1982 | Palitto |
| 4,465,299 A | * | 8/1984 | Stone et al. .............. 188/299.1 |
| 4,683,992 A | * | 8/1987 | Watanabe |
| 4,804,203 A | | 2/1989 | Glab et al. ................... 280/707 |
| 4,827,416 A | | 5/1989 | Kawagoe et al. ...... 364/424.05 |
| 4,867,487 A | | 9/1989 | Phillis ......................... 285/305 |
| 4,886,466 A | | 12/1989 | Doherty et al. ............. 439/191 |
| 5,097,929 A | * | 3/1992 | Spoto |
| 5,190,126 A | * | 3/1993 | Curnutt ....................... 188/269 |
| 5,207,300 A | * | 5/1993 | Engel et al. |
| 5,374,077 A | | 12/1994 | Penzotti et al. ............. 280/711 |
| 5,655,794 A | | 8/1997 | Sell .............................. 285/25 |
| 5,869,754 A | | 2/1999 | Scott et al. ................... 73/121 |
| 6,007,345 A | * | 12/1999 | Francis et al. ........... 188/282.2 |
| 6,044,940 A | * | 4/2000 | Marzocchi et al. ...... 188/299.1 |
| 6,082,508 A | | 7/2000 | Davis ......................... 188/298 |
| 6,116,399 A | | 9/2000 | Drex et al. ................... 192/91 |
| 6,119,832 A | | 9/2000 | Hofmann ............... 188/322.13 |
| 6,126,610 A | | 10/2000 | Rich et al. .................. 600/529 |
| 6,345,706 B1 | * | 2/2002 | Oliver et al. ............ 188/282.2 |
| 6,379,162 B1 | * | 4/2002 | Raypole et al. |
| 6,405,841 B1 | * | 6/2002 | Zeno |
| 6,454,060 B1 | * | 9/2002 | Lisenker et al. |

FOREIGN PATENT DOCUMENTS

| | | | |
|---|---|---|---|
| EP | 1236926 | * | 9/2002 |
| JP | 1038007 | * | 2/1998 |

* cited by examiner

*Primary Examiner*—Douglas C. Butler
(74) *Attorney, Agent, or Firm*—Scott A. McBain

(57) ABSTRACT

The invention provides a damper assembly (10) comprising a housing (12) defining an inner chamber (22, 24) having a damping fluid disposed therein. A piston rod (14) is slidably retained by the housing (12), and at least partially extends into the chamber (22, 24). A piston (18) is disposed at a first distal end (21) of the piston rod (14) and strokes inside the housing (12). The piston (18) defines a first chamber (22) and a second chamber (24) within the housing (12) and includes at least one aperture (26) for allowing damping fluid to flow between the first (22) and second (24) chambers. An actuator (30) is disposed within the piston (18) for varying the flow of damping fluid through the aperture (26) between the first (22) and second (24) chambers within the housing (12). The piston rod (14) includes an inner bore (16) that receives pressurized air from an external source for communicating pneumatic control signals to the actuator (30).

5 Claims, 7 Drawing Sheets

PNEUMATIC CONNECTIONS FOR VEHICLE SUSPENSIONS

BACKGROUND OF THE INVENTION

The subject invention relates to a connector and, more particularly, to a pneumatic connector.

A suspension damper provides wheel control and ride quality to a vehicle by damping vibration generated by such variables as rough road surfaces, pot holes and unbalanced tires. These dampers typically operate by transmitting applied vibrational forces to a piston movably mounted in a fluid filled chamber in the damper. As the piston strokes through the chamber, the fluid in the chamber is forced through and around the piston. The resistance of the piston to movement through the fluid in the chamber is proportional to the vibrational force applied. Accordingly, these vibrational forces are dampened, thereby reducing the amount of vibration transferred to the passenger compartment.

In order to improve the damping properties, dampers have been made with controllable features to dissipate vibrational and other forces exerted on the vehicle. These variables are communicated to the damper via a control signal, and the damper responds appropriately. The control signals are often electrical, but may also be hydraulic, pneumatic or mechanical. The control signal must be routed to the actuation device controlling the damper variations. Often, the actuation device is within the damper and sometimes within the piston. Many controllable dampers have an electric control signal routed to the piston. An example of such a damper is disclosed in U.S. Pat. No. 6,007,345 to Francis et al. Other dampers have a pneumatic control signal routed to the piston. An example of this type of damper is disclosed in U.S. Pat. No. 4,886,466 to Doherty et al.

Francis et al. disclose a damper and electrical connector system requiring electrical wires to be routed through a hollow damping rod wherein an electrical connector is connected to an actuation device, such as a solenoid valve, within a housing. The electrical connector includes a power terminal having a barrel portion extending downwardly for receiving an electrode carried in the hollow damping rod. The solenoid valve is connected to the electrode and may be opened and closed to vary the dampening of the shock absorber.

Doherty et al. disclose a combination pneumatic/electrical connector that supplies electricity and gas to a device to control the flow of fluid through the piston. The connector has pneumatic and multiple electrical interfaces contained within a single pair of connectors that may be mated such that the pneumatic and multiple electrical interfaces are completed simultaneously when the two connectors are mated.

Both of the connectors are compact enough to fit in a hollow piston rod of a suspension strut or shock absorber. However, these connectors are complicated in design and limited in their application. The prior art connectors can only be packaged in certain types of dampers. In addition, as a consequence of the complicated design, the connectors of the prior art are costly to manufacture and maintain. Further, the connectors of the prior art are difficult to diagnose in a service application.

It is desirable to provide a pneumatic connector that routes only a pneumatic signal into a hollow damper rod.

SUMMARY OF THE INVENTION AND ADVANTAGES

The invention provides a damper assembly comprising a housing defining an inner chamber with a damping fluid disposed therein. A piston rod is slidably retained by the housing, and at least partially extends into, the chamber. A piston is disposed at a first distal end of the piston rod and strokes inside the housing. The piston defines a first chamber and a second chamber within the housing and includes at least one aperture for allowing damping fluid to flow between the first and second chambers. An actuator is disposed within the piston for varying the flow of damping fluid through the aperture between the first and second chambers within the housing. The piston rod includes an inner bore that receives pressurized air from an external source for communicating pneumatic control signals to the actuator.

The connector of the present invention is simplified over the prior art by routing pneumatic signals into a hollow damper rod to control the flow of fluid through a piston, while isolating the signal from atmospheric pressure. In addition, the pneumatic connector of the present invention may incorporate an integral flow restrictor for filtering the pneumatic signal supplied from an external source. Moreover, the pneumatic connector of the present invention has a broad application and may be packaged in various types of dampers.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
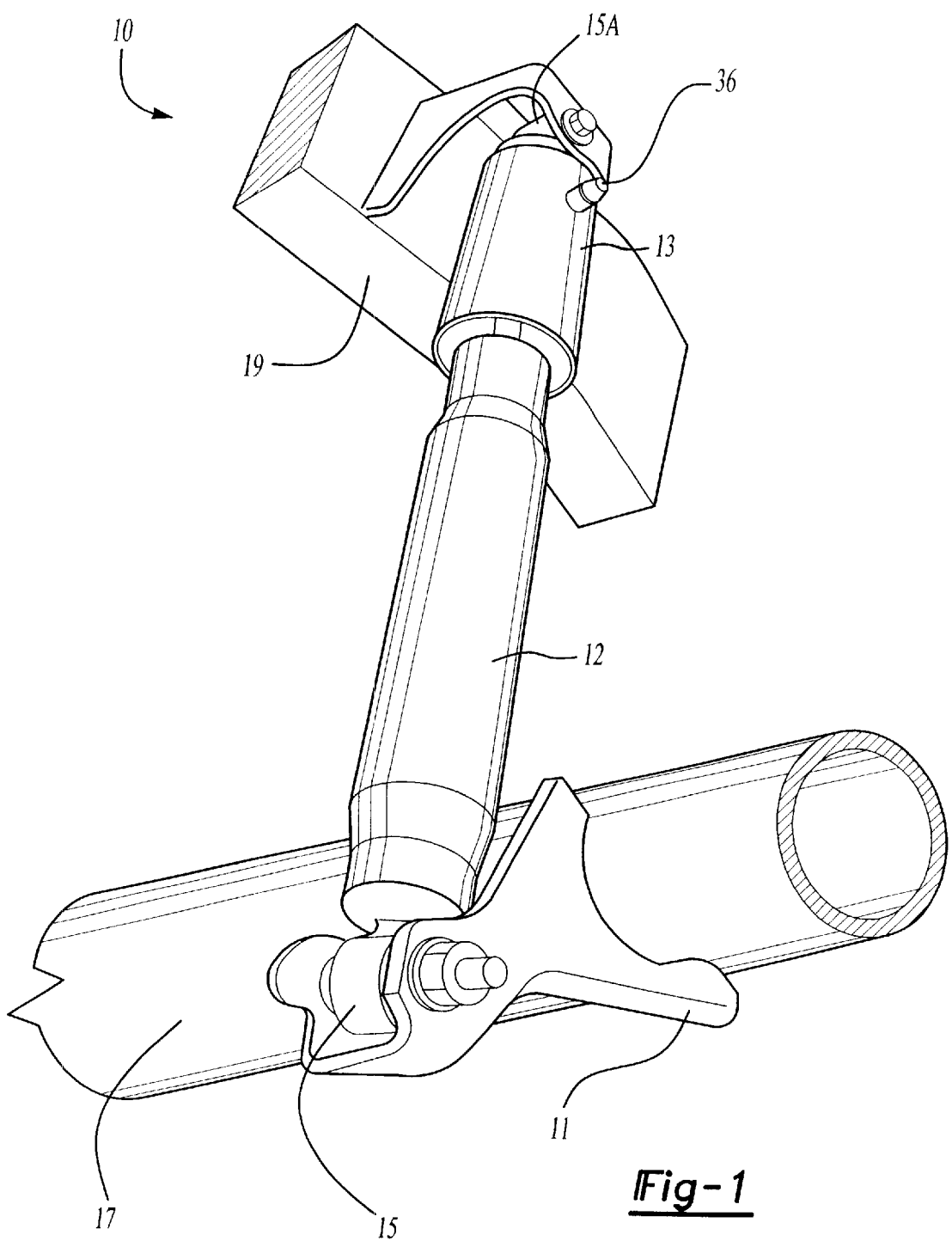
FIG. 1 is a perspective view of a shock absorber assembly wherein the pneumatic connection is disposed.

Referring to FIG. 1, a damper assembly is generally shown at 10. In a first preferred embodiment, the damper assembly 10 is a shock absorber. The damper assembly 10 includes a housing 12 and a stroking portion 13. A connector 15 is affixed to the bottom of the housing 12. An additional connector 15A is affixed to the top of the stroking portion 13. As is known in the art of vehicle suspensions, the connector 15 pivotally affixes the housing 12 to a bracket 11 on the suspension system 17, and connector 15A pivotally affixes the stroking portion 13 to the vehicle frame 19.

Figure 2:
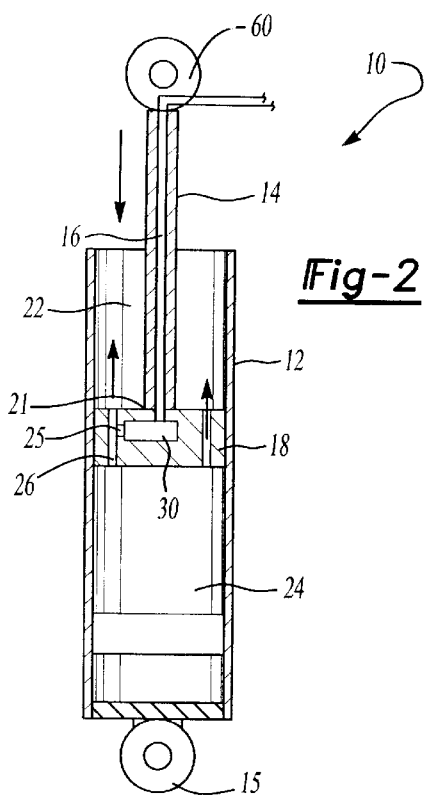
FIG. 2 is a cross sectional view of the damper assembly, showing the actuator not impeding the flow of damping fluid through a piston aperture.
Figure 3:
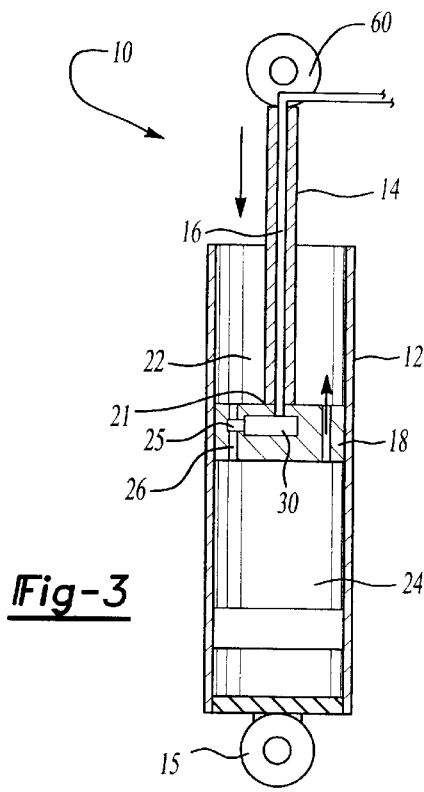
FIG. 3 is a cross sectional view of the damper assembly, showing the actuator impeding the flow of damping fluid through a piston aperture.
Figure 4:
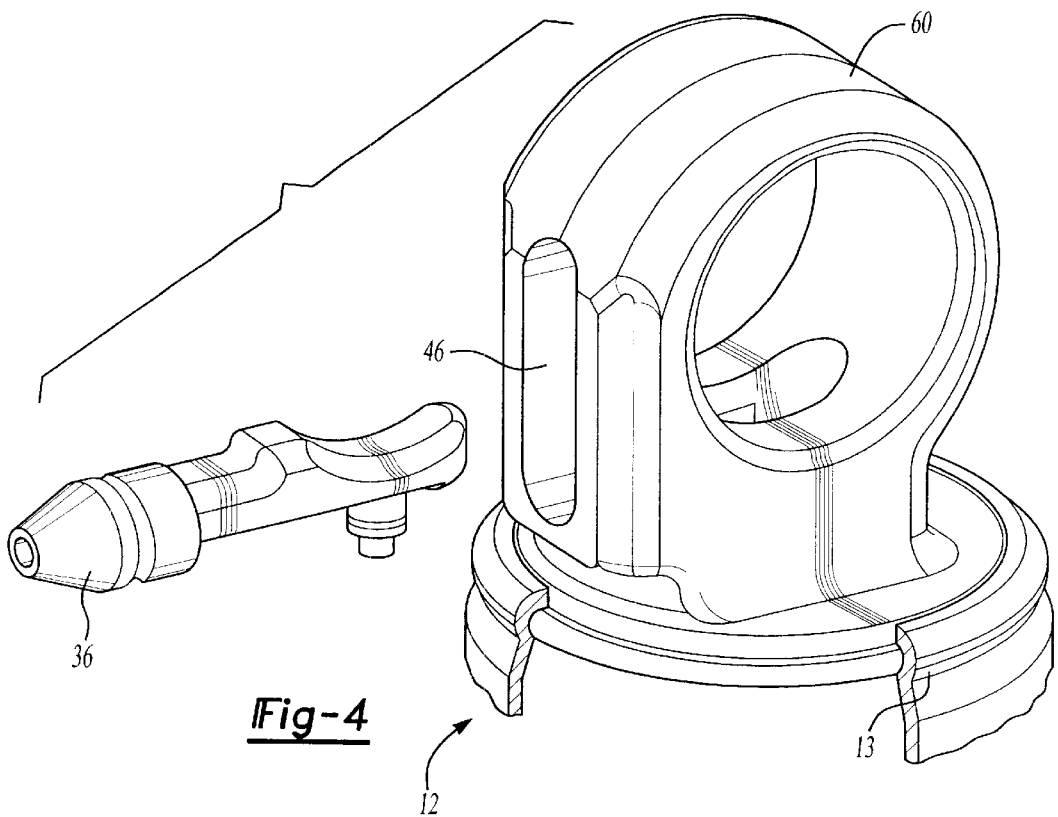
FIG. 4 is a cross sectional view of a connector and a damper having a slotted ring mount for receiving a connector.

Referring to FIGS. 2 and 3, a cross-sectional view of the damper assembly 10 is shown having a piston rod 14 defining an inner bore 16. The piston rod 14 is movably retained by the housing 12, which has a damping fluid disposed therein. The piston rod 14 strokes into and out of the housing 12 according to whether the distance between the frame 19 and the suspension system 13 is increasing or decreasing due to such variables as rough road surfaces, potholes and unbalanced tires.

A piston 18 is disposed at a first distal end 21 of the piston rod 14 and strokes inside the housing 12 along with the piston rod 14. The piston 18 defines a first chamber 22 and a second chamber 24 within the housing 12 wherein the damping fluid is disposed. The piston 18 includes at least one aperture 26 for communicating damping fluid between the first 22 and second 24 chambers of the housing 12. An actuator 30 is disposed within the piston 18 for varying the flow of the damping fluid through the piston 18 between the first 22 and second 24 chambers within the housing 12.

Referring to FIGS. 2 and 3, a pin 25 is disposed within the actuator 30. Upon activating the actuator 30 with a pneumatic control signal, the pin 25 extends from the actuator 30 and obstructs the aperture 26 disposed within the piston 18, thereby reducing the flow of the damping fluid through the piston 18 between the first 22 and second 24 chambers within the housing 12, as shown in FIG. 3. By transmitting an opposite pneumatic control signal to the actuator 30, the pin 25 retracts opening the aperture 26 to permit damping fluid to flow freely through the piston 18.

Referring to FIGS. 4 through 8, the piston rod 14 further includes a stroking portion 13 at an end opposite from the piston 18. The stroking portion 13 is disposed outside the housing 12 and retains a cover 60. A seal 34 (FIGS. 4–7) seals the cover 60 to the piston rod 14 for retaining pneumatic air pressure within the piston rod 14. The cover 60 comprises a ring style upper mount utilized for securing the assembly 10 to the vehicle frame 19.

Figure 5:
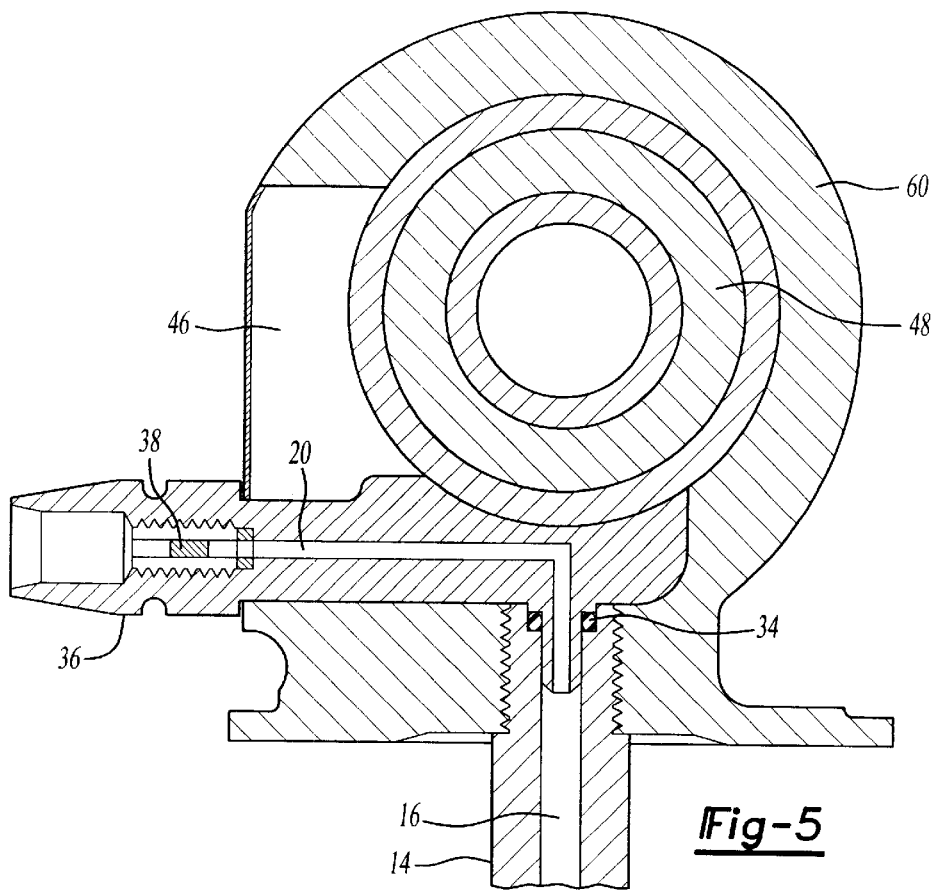
FIG. 5 is a cross sectional view of a connector disposed within the cover of the damper assembly and in fluid communication with the inner bore of the piston rod.
Figure 6:
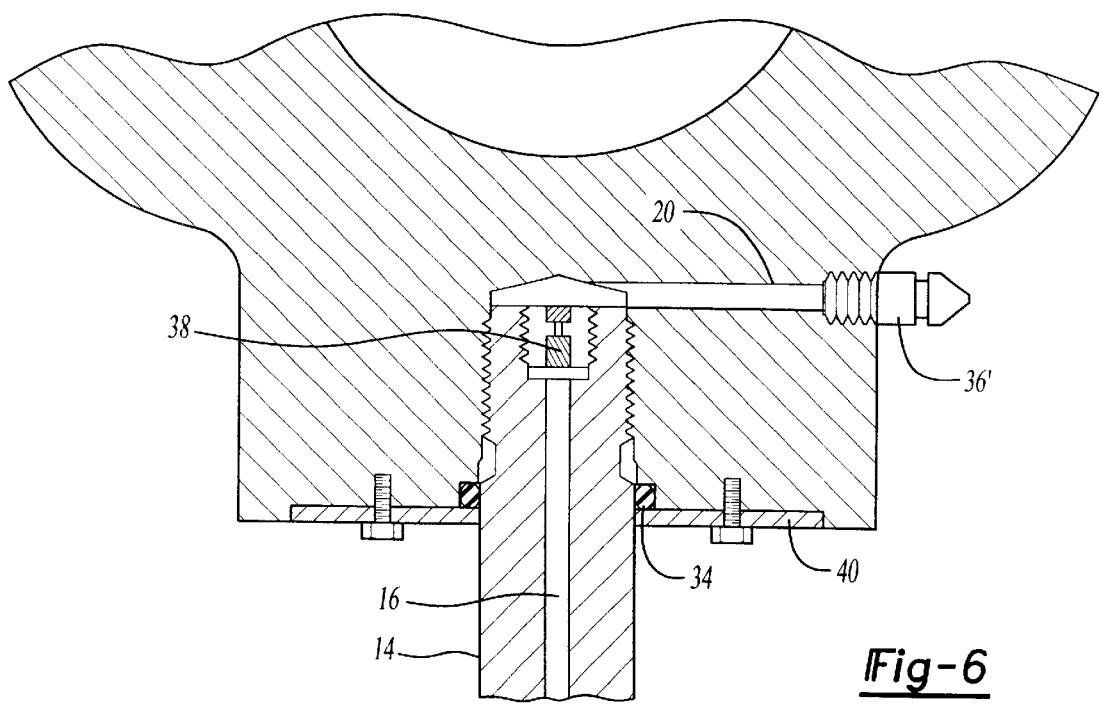
FIG. 6 is a cross sectional view of a hollow rod connector disposed in the cover.
Figure 8:
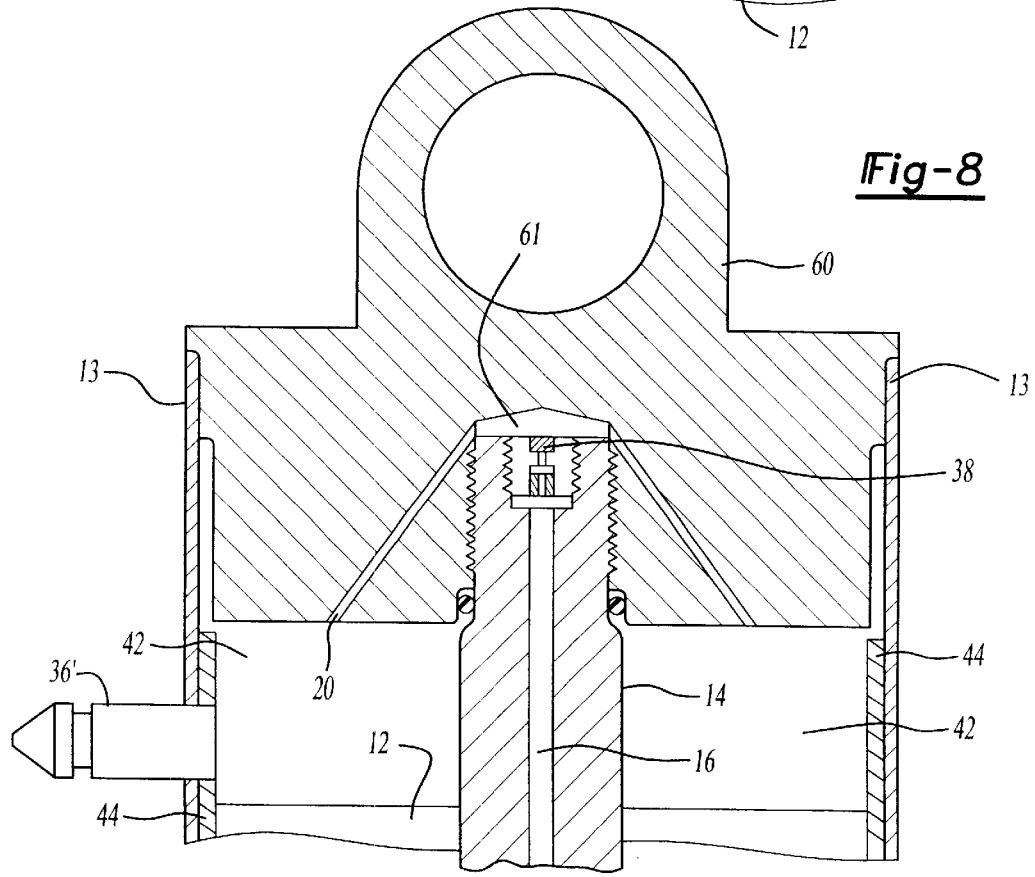
FIG. 8 is a cross sectional view of the piston rod disposed within a cover showing two input passageways with a sealant extending downwardly.

As shown in FIGS. 5, 6 and 8, the cover 60 defines at least one input passageway 20 that is in fluid communication with the inner bore 16 of the piston rod 14. In particular, referring to FIG. 5, the cover 60 is a ring style upper mount having a slot 46 in a side of the cover 60 providing access for positioning a connector 36 within the cover 60. A bushing 48 is disposed in the cover 60 for retaining the connector 36 within the cover 60. The bushing 48 also receives a pin (not shown) for connecting the assembly 10 to the vehicle frame 19. The connector 36 disposed in the cover 60 is adapted for receiving a coupling device (not shown) and defines the input passageway 20 in fluid communication with the inner bore 16 of the piston rod 14. The coupling device may be any type of pneumatic connector, such as a Schraeder Valve or a Quick Connect Coupling as described in U.S. Pat. No. 4,867,487 to Phillis. The assembly 10 of the subject invention further includes a flow restrictor 38 disposed in the inner passageway 20 for varying the pneumatic control signal communicated through the inner bore 16.

Referring to FIG. 6, in another embodiment of the subject invention, the connector 36' is a hollow rod threaded into the cover 60. The seal 34 disposed between the cover 60 and the piston rod 14 isolates the pneumatic air pressure inside the piston rod 14 from environmental pressure. A seal plate 40 is disposed in the cover 60 for maintaining the position of the seal 34. The flow restrictor 38 is disposed in the inner bore 16 for varying pneumatic control signals being communicated through the inner bore 16 and filtering pressure in the piston 18.

Figure 7:
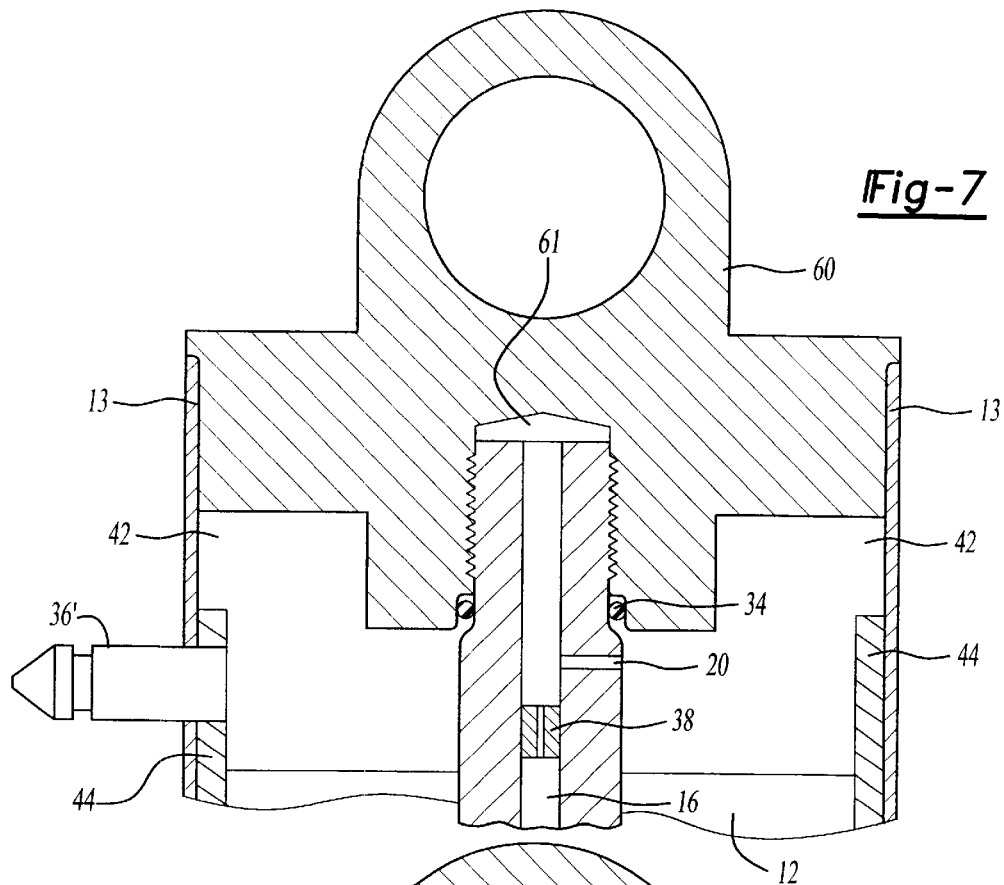
FIG. 7 is a cross sectional view of the piston rod showing an input passageway having a sealant extending downwardly.

The embodiments shown in FIGS. 7 and 8 are employed when the pneumatic pressure is routed through the inner passageway 20 and inner bore 16 to the piston 18 from a control chamber 42. The cover 60 is secured to the piston rod 14 and the stroking portion 13 extends over the housing 12 to form the control chamber 42. The control chamber 42 has a seal 44 disposed between the housing 12 and the stroking portion 13 to maintain a control pressure within the control chamber 42. The connector 36 is inserted through the stroking portion 13 and seal 44, and extends into the control chamber 42 for communicating pneumatic signals into the control chamber 42. As shown in FIG. 7, the inner passageway 20 is disposed in the piston rod 14 above the flow restrictor 38. Referring to FIG. 8, a plurality of inner passageways 20 are disposed in the cover 60 and terminate in a cavity 61 above the piston rod 14. The cavity 61 communicates air pressure from the control chamber 42 to the inner bore 16.

Figure 9:
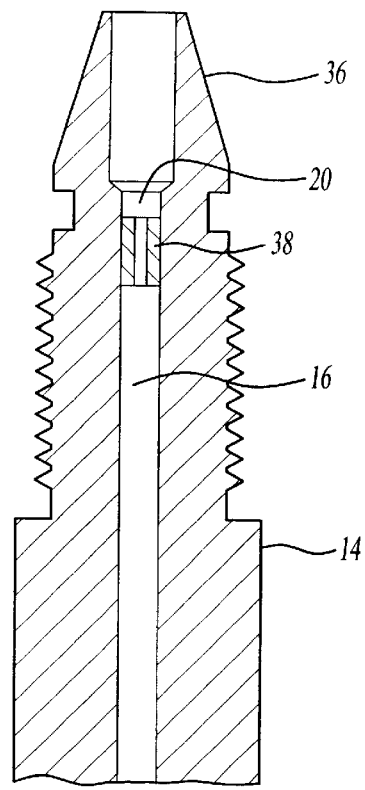
FIG. 9 is a cross sectional view of a tennon style upper mount cover disposed on the piston rod.

A further alternative embodiment is shown in FIG. 9. Here, the piston rod 14 is a tennon-style strut having a frustoconical tip and a threaded shaft. The strut defines the input passageway 20 which is in fluid communication with the inner bore 16 for communicating pneumatic control signals. In addition, the flow restrictor 38 is disposed within the inner bore 16.

Figure 10:
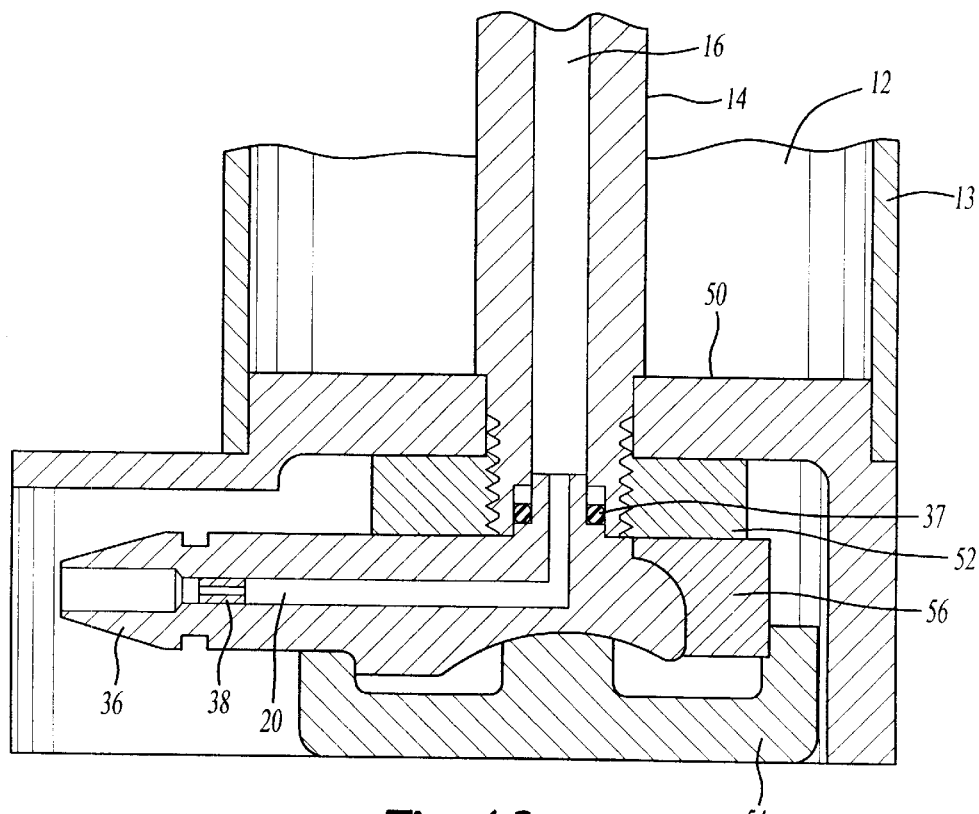
FIG. 10 is a cross sectional view of the pneumatic connection system disposed within a strut.
Figure 11:
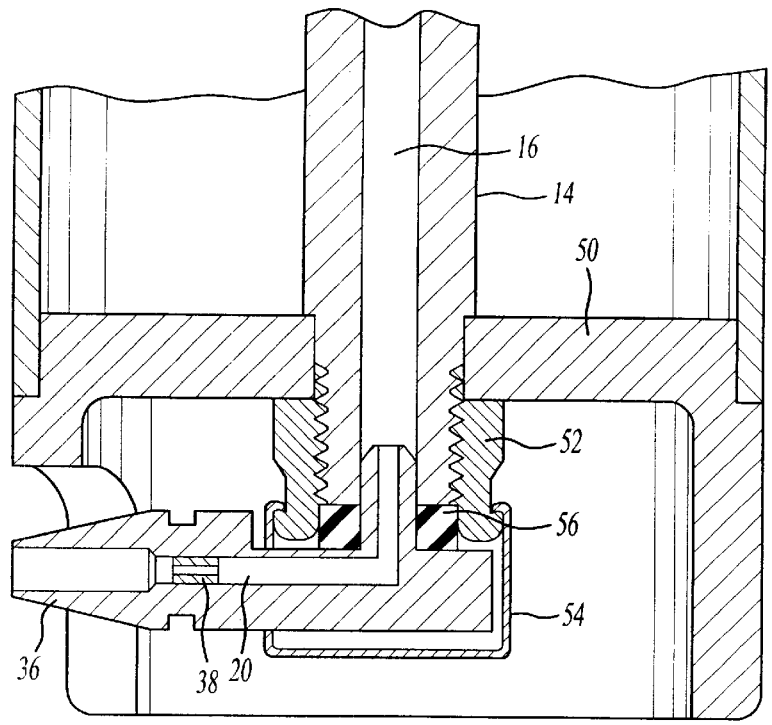
FIG. 11 is a cross sectional view of the pneumatic connection system disposed within a strut showing the connector secured in place by a contoured nut and a clip fastener.
Figure 12:
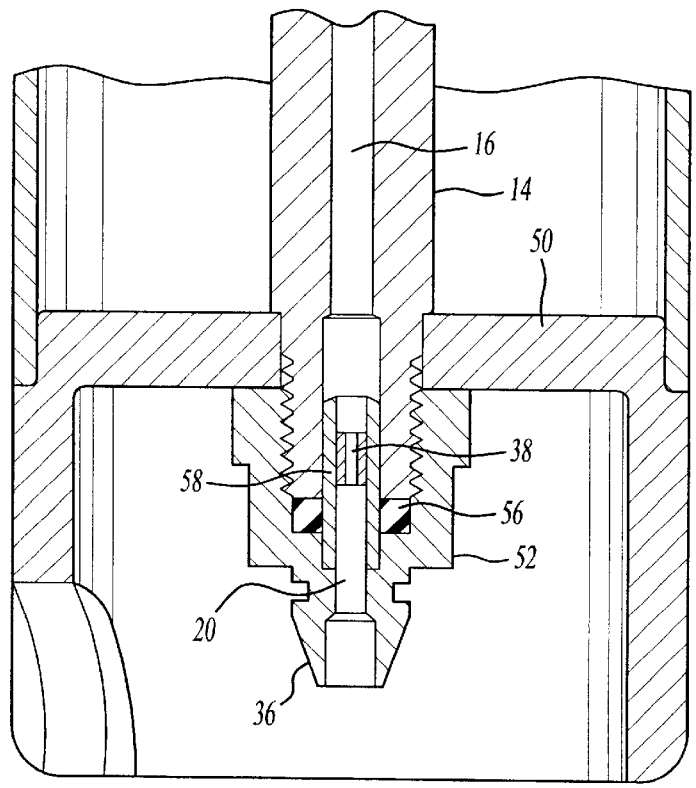
FIG. 12 is a cross sectional view of the pneumatic connection system disposed within a strut having an integral connector disposed in a nut holding the piston rod to the strut base.

Referring to FIGS. 10, 11 and 12, the stroking portion 13 comprises a strut having a strut base 50. The housing 12 extends into the stroking portion 13 and the piston rod 14 is mounted to the strut base 50. The embodiment shown in FIG. 10 utilizes the same connector 36 and flow restrictor 38 as that shown in FIG. 4. The embodiments shown in FIGS. 10 and 11 further include a nut 52 threaded onto the piston rod 14 between the connector 36 and the strut base 50. The nut 52 secures the piston rod 14 to the strut base 50. Further included in the embodiments shown in FIGS. 10 and 11 is a fastener 54 disposed around the connector 36 and fastened to the nut 52 for securing the piston rod 14 and the connector 36 in operating position. A seal 37 seals the piston rod 14 to the connector 36 preventing the pneumatic signal from being adversely affected by environmental pressure.

In the embodiment shown in FIG. 11, the fastener 54 comprises a clip fastener. An adaptor 56 disposed between the nut 52 and the fastener 54 supports the connector 36 within the strut base 50. The embodiment shown in FIG. 12 includes a hollow sleeve 58 partially received by the inner bore 16 of the piston rod 14. The adaptor 56 circumscribes that portion of the sleeve 58 not received by the bore 16 and is, thereby held in place.

Figure 13:
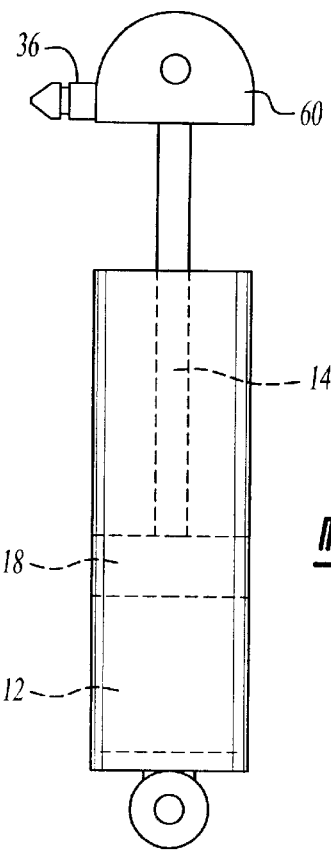
FIG. 13 is a side view of a connector disposed on a ring style upper mount cover wherein the cover is disposed on the piston rod and a piston is disposed within a housing.

Referring to FIGS. 13 through 16, side views of the embodiments discussed above are shown. FIG. 13 is a full side view of the partial view shown in FIGS. 5 and 6. In particular, FIG. 13 shows a side view of the connector 36 disposed on the ring style upper mount cover 60 wherein the cover 60 is disposed on the piston rod 14 and the piston 18 is disposed within the housing 12. Pneumatic pressure travels through the cover 60 and into the piston rod 14, as shown in FIGS. 2 and 3. The air continues through the tube to the actuator, as discussed above.

Figure 14:
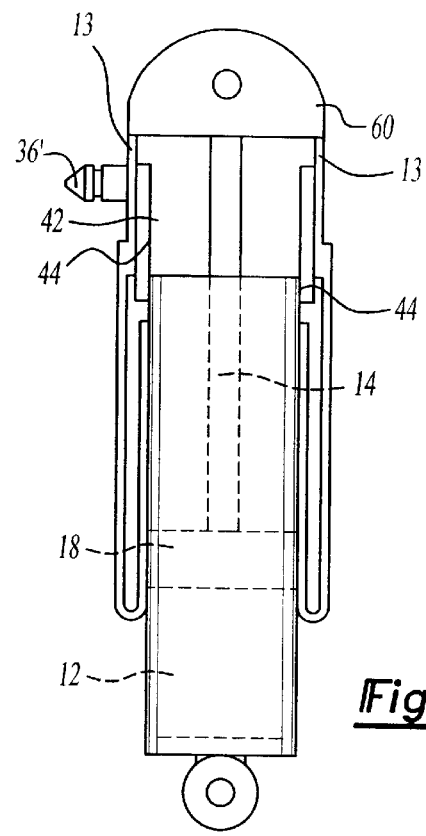
FIG. 14 is a side view of a connector disposed in the extension of a ring style upper mount cover showing the cover disposed on the piston rod and the piston rod disposed within the housing.

FIG. 14 is a full side view of the partial view shown in FIGS. 7 and 8. In particular, FIG. 14 shows a side view of the connector 36' disposed on an extension of a ring style upper mount cover 60 wherein the cover 60 is affixed to the end of the piston rod 14 and the piston rod 14 is disposed within the housing 12.

Figure 15:
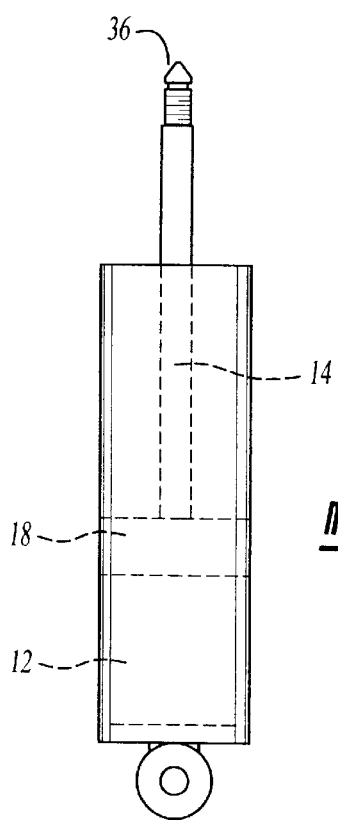
FIG. 15 is a side view of a tennon style upper mount cover disposed on a piston rod showing the piston rod disposed within a housing.

FIG. 15 is a full side view of the partial view shown in FIG. 9. In particular, FIG. 15 shows a side view of a tennon style upper mount cover 60 disposed on a piston rod 14 having the piston rod 14 disposed within a housing 12.

Figure 16:
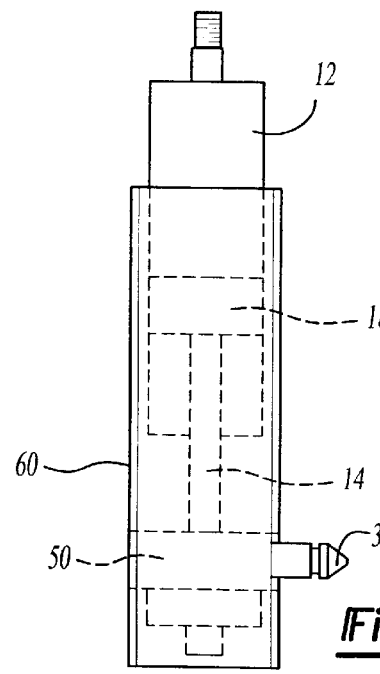
FIG. 16 is a side view of the pneumatic connection system in a strut application.

FIG. 16 is a full side view of the partial view shown in FIGS. 10, 11 and 12. In particular, FIG. 16 shows a side view of a strut application wherein the housing 12, cover 60, piston rod 14 and connector 36 are inverted, and the connector 36 is disposed in a strut base 50.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described. The invention may be practiced otherwise than as specifically described within the scope of the appended claims. In addition, the reference numerals in the claims are merely for convenience and are not to be read in any way as limiting.

What is claimed is:

1. A damper assembly comprising:

a housing having a damping fluid disposed therein;

a piston rod having a rod defining an inner bore, wherein said piston rod at least partially extends into said housing, is movably disposed within said housing, and defines an input passageway being in fluid communication with said inner bore for communicating control signals to an actuator and controlling said actuator;

a piston disposed at a first distal end of said piston rod extending into said housing to define a first chamber and a second chamber within said housing, wherein said piston includes at least one aperture for communicating said damping fluid between said first and second chambers of said housing; and a cover operably attached to a second distal end of the piston rod, comprising a connector adapted for receiving a coupling device, said connector in fluid communication with the inner bore of the piston rod;

wherein said actuator is disposed within said piston and is operable to obstruct the at least one aperture;

wherein said piston rod further includes a stroking portion at an end opposite from said first distal end having the cover secured to said stroking portion;

wherein a seal is disposed between said cover and said piston rod for maintaining pressure within said piston rod;

wherein said connector is a hollow rod; and wherein said cover is a ring style upper mount and said hollow rod is disposed in said ring style upper mount.

2. The damper assembly of claim 1, wherein the actuator comprises a pin operable to extend from the actuator.

3. The damper assembly of claim 2, wherein the pin is pneumatically controlled.

4. The damper assembly of claim 1, wherein the connector adapted for receiving a coupling device comprises a quick-connect coupling device.

5. The damper assembly of claim 1, wherein the connector adapted for receiving a coupling device comprises a Schraeder valve.

* * * * *